UNITED STATES PATENT OFFICE.

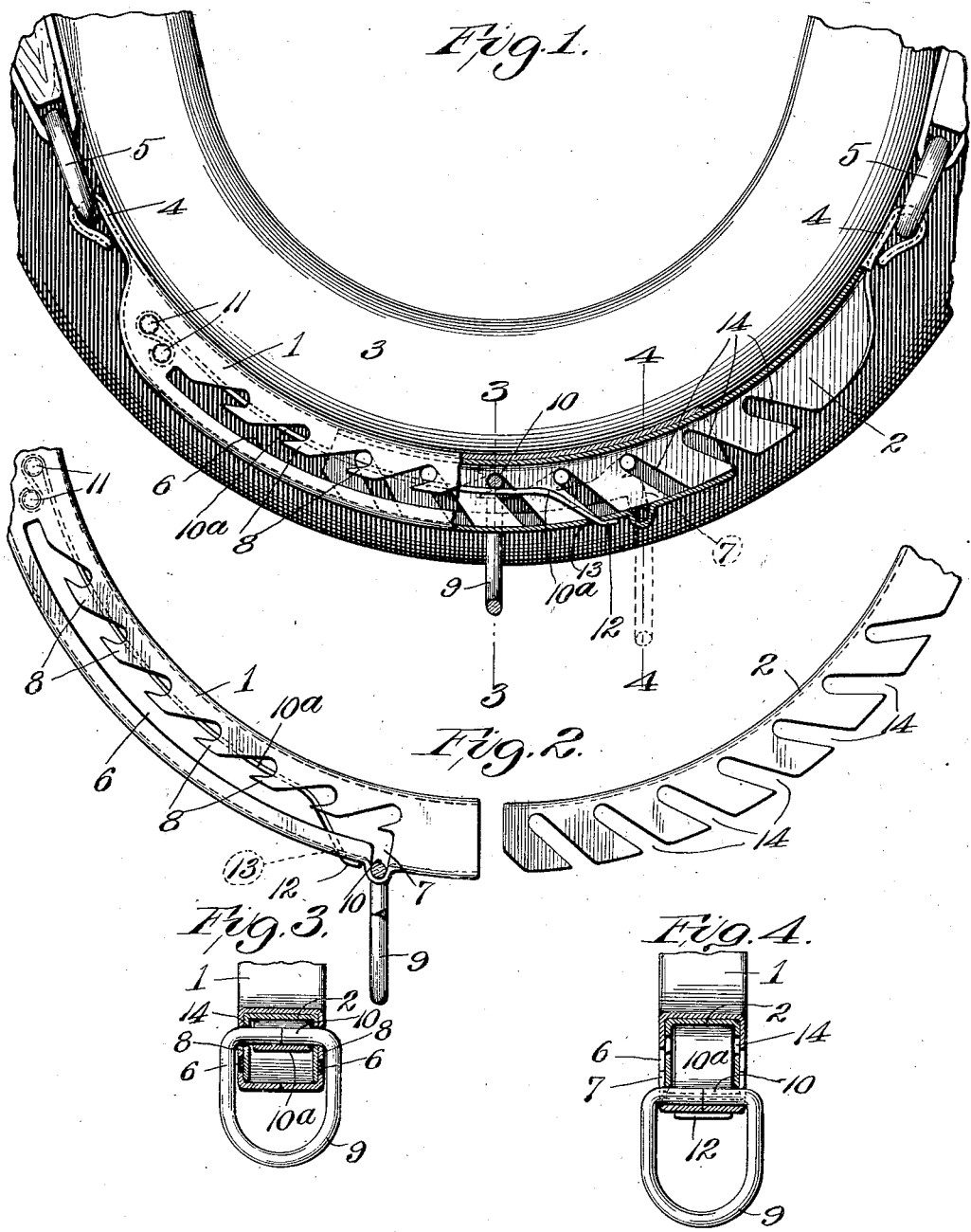

AUDY A. LOWRY, OF TAMMS, ILLINOIS.

HAME-FASTENER.

1,058,187.     Specification of Letters Patent.     Patented Apr. 8, 1913.

Application filed January 22, 1912. Serial No. 672,726.

*To all whom it may concern:*

Be it known that I, AUDY A. LOWRY, a citizen of the United States, and resident of Tamms, Illinois, have invented certain new and useful Improvements in Hame-Fasteners, of which the following is a specification containing a full, clear, and exact description, reference being had to the accompanying drawings, forming a part hereof.

My invention relates to an improved hame fastener and consists in the novel construction hereinafter described and pointed out in the annexed claim.

The object of my invention is to provide an improved hame fastener in which all the parts shall be cheaply constructed of metal and which shall be convenient and efficient in use.

In the drawings: Figure 1 is a sectional front elevation of my improved hame fastener applied to a common collar and hames, parts of the latter being broken away as unnecessary to be shown; Fig. 2 is a front elevation of parts of the two telescopic locking sections separated; Fig. 3 is a vertical section through the hame fastener on the line 3—3 of Fig. 1; and Fig. 4 is a view similar to the last, the section being taken on the line 4—4 of Fig. 1.

The numerals 1 and 2 respectively indicate the telescopic locking sections of the hame fastener, and these are preferably made of sheet metal bent into rectangular shape in cross sections and curved longitudinally to fit the curvature of the horse collar, which latter is indicated by the numeral 3. Each of the locking sections 1 and 2, have their outer ends flattened at 4, and the flattened portion thus formed (when the hame fastener is to be secured to the usual hame links 5) may be inserted through the said hame links and bent into hook form by striking it with a common hammer or other tool, so that the said telescopic sections will thereby be securely fastened to the hames. Formed in the vertical walls of the section 1 is a curved slot 6 which terminates at its inner end at a notch or recess 7, and formed in the said walls above said curved slot, are a series of downwardly projecting hooks or teeth 8, which I may term "ratchet teeth."

The numeral 9 indicates a ring or link having a straight side 10, which occupies the notch or recess 7 in section 1 prior to the locking together of the sections, and same is shown in such position in Figs. 2 and 4. Said ring or link 9 may be placed in position in numerous ways well known to skilled mechanics, but I propose to construct the said ring or link as an open link with its ends separated a sufficient distance to enable them to be inserted in the slot 6 or recess 7, and then close together the ends of the link.

The numeral 10ª indicates a long flat metal spring, one end of which is fixed upon one or more pins 11 extending across the section from one vertical wall to the other, so that one end of said spring will be thereby fixed and the body of the spring will extend upon the interior of the said section and follow the curvature thereof and pass each of the teeth 8 in a plane above the curved slot 6 to a point closely adjacent the inner end of said section where the said spring is bent downwardly and its inner end 12 is passed through a slot 13 formed in the outer peripheral wall of the said section 1. The telescopic section 2 is adapted to be telescoped within said section 1 and is provided in its opposite vertical walls with a series of inclined slots 14. The said section 2 has no outer peripheral wall, although, as previously stated, it is substantially rectangular in cross section.

The operation is as follows: The sections 1 and 2 having been secured to the hame links 5 in the manner previously described, all that is necessary to fasten the hames upon the collar 3 is to place the inner end of the section 2 within the open inner end of the section 1, and push it forward until the hames are clamped tightly upon the collar, and then the operator should grasp the link or ring 9, elevate it out of the recess 7, and slide it forward into the curved slot 6 until it engages one of the inclined slots 14 in the opposite vertical walls of section 2, after which the operator should exert sufficient pull upon said ring or link in the same direction to cause the said section 2 to be still further forced within the outer section 1, until the straight side 10 of the said ring or link 9 is brought in front of one of the teeth 8 of said section 1, and then upon the release of said ring or link the spring will force the said straight side of said ring or link up into one of the inclined slots between two of said teeth 8, where the said ring or link will rest until dislodged by the operator for the purpose of unfastening the hames. In order to unfasten the hames, it will only be necessary to release the said ring or link 9 from the teeth of the section 1 by pulling the said link or ring downwardly and outwardly, thereby unhooking it from the teeth 8 and compressing the said spring 10ª until the straight side 10 of said ring or link is again located in the curved slot 6, when the section 2 may be withdrawn, the link or ring 9 sliding in said curved slot being caused to again occupy the recess in section 1.

What I claim is:

An improved hame fastener, comprising two telescopic locking sections having locking teeth and slots inclined in one section in a direction opposite the inclination of the teeth and slots in the other section, means at the outer end of each section for attaching same to the hames, said sections being rectangular in cross section, and one of said sections having a curved longitudinal slot in its vertical walls intersected by the inclined slots between the teeth of said section, said curved slot terminating at its inner end in a recess, a ring arranged to slide in said curved slot and rest within said recess, and a spring to force said ring upwardly into engagement with the teeth of said section when the sections are to be locked together.

In testimony whereof, I have signed my name to this specification, in presence of two subscribing witnesses.

AUDY A. LOWRY.

Witnesses:
J. G. STEGMELLER,
CHAS. DAVIS.

Copies of this patent may be obtained for five cents each, by addressing the "Commissioner of Patents, Washington, D. C."